April 6, 1965     L. R. WILT     3,176,602
MOVIE CAMERA AND AUTO DASH MOUNTING MEANS
Filed July 3, 1963
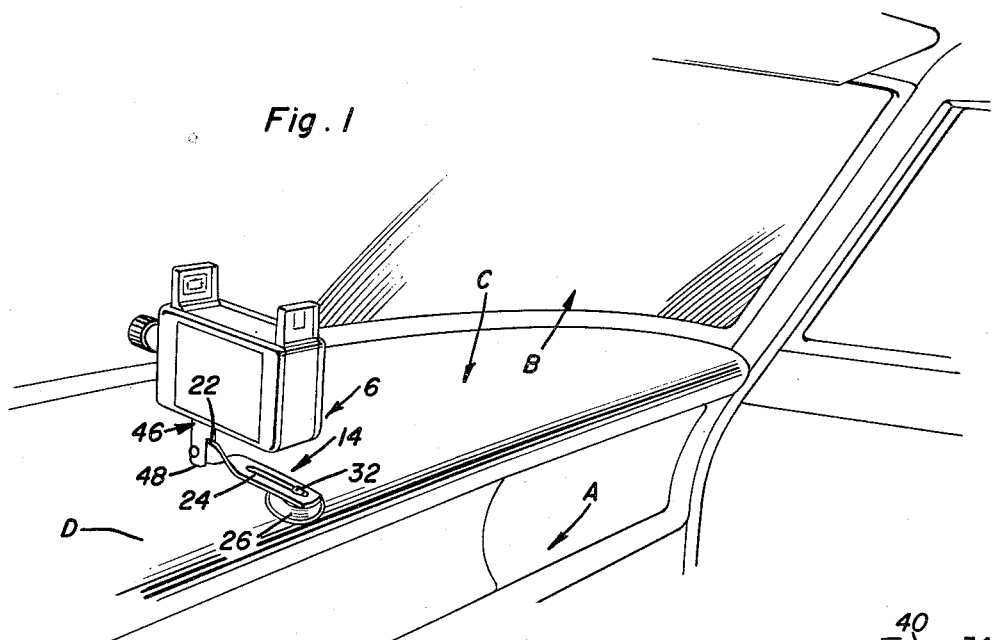
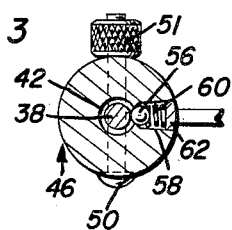
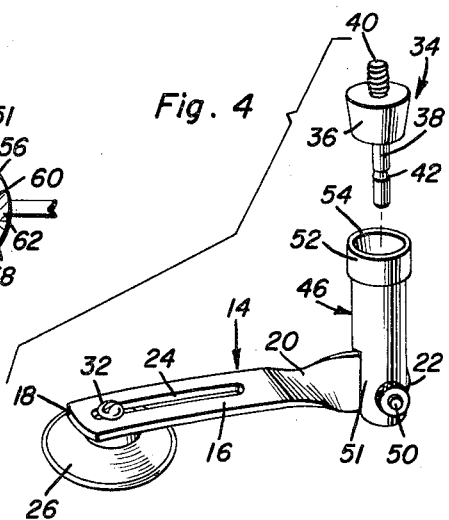
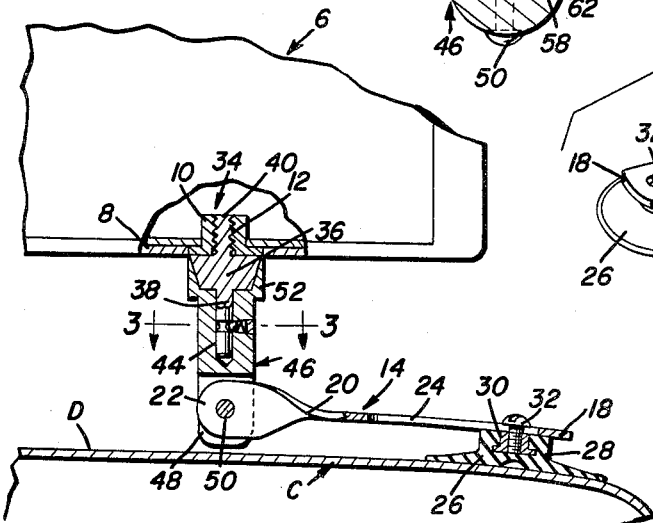
Loyal R. Wilt
INVENTOR.

United States Patent Office 3,176,602
Patented Apr. 6, 1965

3,176,602
MOVIE CAMERA AND AUTO DASH
MOUNTING MEANS
Loyal R. Wilt, 4001 N. Hiway 61, White Bear Lake, Minn.
Filed July 3, 1963, Ser. No. 292,685
1 Claim. (Cl. 95—86)

The present invention relates to means, broadly construed, whereby a movie camera may be reliably located and supported rearwardly of a windshield and atop the cowl portion of the instrument panel and thus poised to take pictures while traveling along a city street or a highway as the case may be.

As is implied it is old in the art to provide bracket means of one type or another, to anchor the bracket means atop the cowl surface and to operatively associate a movie camera therewith so that the lens means thereon may be appropriately positioned relative to the windshield. As will be hereinafter more fully appreciated it is an objective in the instant matter to improve upon prior art automobile-type movie camera mounts and supports.

One improvement resides in the adoption and use of a simple but novel bracket. Briefly, the bracket comprises an arm having a rearwardly disposable end which is provided with anchoring or holddown means, the latter being removably mounted atop the selected surface so that it will be convenient for use by the occupants of the front seat.

More particularly, the bracket means is characterized by a simple lightweight but rigid arm having its rearward end provided with a suction cup or equivalent holddown means and having its forward end designed and adapted for the attachment thereto of a relatively adjustable connector.

Another improvement has to do with a connector or coupling means detachably and hingedly joined with a forward end of the bracket arm and which in turn has an upper end which is constructed to accommodate and retain an adapter in place.

It follows, too, that the adapter is a further improvement in that it has a screw-threaded shank to be screwed into an existing screw-threaded socket on the bottom of a conventional-type movie camera and further has swiveling means rotatably and detachably connectible with the above-named adjustable connector.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary perspective view showing oriented portions of the instrument panel or dash, as it is sometimes called, windshield, cowl, movie camera and bracketing and mounting means therefor;

FIGURE 2 is a view on a larger scale but based on FIG. 1 and with the cowl in section, a portion of the camera broken away, and the component parts of the mounting means in section and elevation and in cooperating relationship;

FIGURE 3 is an exaggerated section taken on the plane of the section line 3—3 of FIG. 2; and FIGURE 4 is a view in perspective showing the bracket means, adapter means, and connector means with the adapter means separated from the connector means.

With reference to FIG. 1 in particular the instrument panel or dash of the automobile or other vehicle herein under consideration is denoted generally at A, the windshield at B and the shelf-like inward cowl at C. The horizontal surface of the means C herein under consideration is denoted at D in FIGS. 1 and 2.

The camera (which is an ordinary movie camera of any suitable make) is denoted by the numeral 6, the bottom thereof 8 (FIG. 2) having a turned in socket member 10 internally screw-threaded at 12, as is usual, to permit mounting of the camera on a portable (also usually collapsible) tripod (not shown). This means 10 and 12 is commonly referred to in the trade as a camera tripod mount.

The supporting and mounting means herein under advisement, broadly and specifically, comprises bracket means which is denoted generally by the numeral 14. More specifically this bracket means comprises a rigid sheet metal or an equivalent arm 16 whose rearward end is denoted at 18, the intermediate portion being twisted slightly upon itself as at 20 in a manner to dispose the forward end portion 22 in a substantially vertical position, that is vertical to the horizontal part 16 of the arm. The latter part is also provided with an elongated slot 24. The end portion 18 is intended in practice to be attached to the surface C in any one of a number of different ways, for example, by a permanent magnet or bolt and nut means (not shown) or, as is usually the case, by way of a rubber or an equivalent suction cup 26. The cup is provided with an upstanding hub portion 28 having a nut 30 embedded therein to accommodate the screw-threaded shank of an assembling and retaining screw 32 whose headed end is cooperable with the elongated slot 24. It follows that the end portion of the arm, as at 18, can be anchored in a desired place by way of the suction cup and by loosening the setscrew 32, the slotted arm can be swung from left to right (relative to the driver) or can be slid forwardly or backwardly in a manner to adjust the forward vertical end portion 22 toward and from the suction cup anchor point.

The adapter means is denoted as a structural entity by the numeral 34 and comprises a one piece unit which embodies a truncated conical head 36 mounted atop the spindle or shank 38 and provided on its upper side with an axial screw-theaded mounting and retaining stud 40. The stud 40 is intended to be screwed into the threads 12 of the aforementioned camera tripod mounting socket or socket member 10. The median portion of the depending stem 38 is provided with a circumferential groove 42.

The grooved stem or shank is fitted rotatively and removably in an axial socket 44 which is provided therefor in the upper major part of the connector or coupling member 46. This member 46 has a lower portion which is bifurcated and the furcations 48 thus provided straddle the end portion 22 of the bracket arm and are fastened in place by a headed bolt 50 which in turn is secured adjustably in place by a knurled readily applicable and removable clamping nut 51 (FIG. 4). The upper end portion 52 of the connector is slightly enlarged and provided with a counterbore the wall of which is beveled as at 54 to provide a seat for the head 36. Thus the head 36 is removably seated and swivelly mounted in the seat means 54 and the stem or shank 38 telescopes and is rotatable in the axial socket 44. A spring-loaded ball detent 56 is provided in a side recess provided therefor as at 58, the associated spring being denoted at 60 and the closing and retaining plug at 62. This spring-pressed ball detent is located to snap into the aforementioned channel or groove 42 whereby to thus latch the shank 38 in the socket means 44 provided therefor.

In practice it will be evident that the adapter means 34 is attached to and remains, under normal circumstances, in its ready-to-use position on the bottom 8 of the camera 6. More particularly the stud 40 is threaded or screwed into the threads 12 of the camera tripod mount 10.

The bracket means 14 is mounted atop the cowl surface D and is held in the intended or desired spot by way of the suction cup 26. The arm 16 can be slid back and forth relative to the anchored position of the suction cup. In addition, by properly adjusting and tightening the screw 32, the arm 16 can be switched or adjusted from side to side so that the arm may be said to be at an approximate right angle to the windshield, that is being straight and assuming the position illustrated in FIG. 1. The fork arms or furcations 48 straddling the terminal end portion 22 in conjunction with the bolt and nut means (which affords a connection between the parts) enables one to tilt the connector 46 either forwardly or rearwardly thus increasing the range of adjustment of the bracket 14 on the one hand, the connector 46 on the other hand or the two together thus insuring such adjustments as are needed. The additional fact that the adapter is attached to the camera and may be removed as a unit therewith and may, in addition, be turned or swivelled relative to the connector means the versatility of the invention is substantially self-evident.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

Means for mounting a movie camera in a usable picture-taking position atop the surface of a horizontal part of an automobile instrument panel structure comprising a rigid bracket arm having a rearward end provided with an adjustable suction cup, having a vertically disposed forward end, a connector having fork means at its bottom straddling said forward end and detachably and adjustably bolted in position thereon permitting the connector to be hinged back and forth relative to the lengthwise axis of said bracket arm, said connector having an upper portion which is axially bored and then counterbored, the axial bore and counterbore constituting communicating sockets, a median portion of said connector being provided with a spring-loaded ball detent normally projecting into the associated socket, and an adapter having a screw-threaded stud at an upper end connectible with existing screw-threaded socket means on the bottom of a movie camera, said adapter having a conical head, said head being swivelly and removably seated in the socket which is uppermost in said connector, said adapter also including a spindle depending axially from the bottom of said head and fitting turnably and removably in the socket provided therefor and having a groove with which said ball detent is cooperable.

References Cited by the Examiner

UNITED STATES PATENTS 2,804,278  8/57  Jewett _____ 95—86 X

NORTON ANSHER, *Primary Examiner.*

JOHN M. HORAN, *Examiner.*